(12) United States Patent
Miki et al.

(10) Patent No.: US 10,131,797 B2
(45) Date of Patent: Nov. 20, 2018

(54) COATING AGENT COMPOSITION AND ANTIBACTERIAL/ANTIVIRAL MEMBER

(71) Applicant: Panasonic Intellectual Property Management Co., Ltd., Osaka (JP)

(72) Inventors: Shinichiro Miki, Osaka (JP); Takeshi Ueda, Osaka (JP); Daigo Yamashina, Osaka (JP); Kensaku Kinugawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 329 days.

(21) Appl. No.: 14/787,005

(22) PCT Filed: Mar. 3, 2014

(86) PCT No.: PCT/JP2014/001132
§ 371 (c)(1),
(2) Date: Oct. 26, 2015

(87) PCT Pub. No.: WO2014/184989
PCT Pub. Date: Nov. 20, 2014

(65) Prior Publication Data
US 2016/0075887 A1  Mar. 17, 2016

(30) Foreign Application Priority Data
May 13, 2013  (JP) .................................. 2013-101466

(51) Int. Cl.
| | | |
|---|---|---|
| *C09D 5/14* | (2006.01) | |
| *C09D 4/00* | (2006.01) | |
| *C09D 201/00* | (2006.01) | |
| *C09D 201/02* | (2006.01) | |
| *C09D 133/08* | (2006.01) | |
| *C09D 5/16* | (2006.01) | |
| *C09D 7/61* | (2018.01) | |
| *C09D 7/40* | (2018.01) | |
| *C08K 3/22* | (2006.01) | |

(52) U.S. Cl.
CPC ................ *C09D 5/14* (2013.01); *C09D 4/00* (2013.01); *C09D 5/1618* (2013.01); *C09D 7/61* (2018.01); *C09D 7/67* (2018.01); *C09D 7/68* (2018.01); *C09D 133/08* (2013.01); *C09D 201/00* (2013.01); *C09D 201/02* (2013.01); *C08K 3/22* (2013.01); *C08K 2003/2241* (2013.01); *C08K 2003/2248* (2013.01)

(58) Field of Classification Search
CPC .. C09D 133/08; C09D 201/00; C09D 201/02; C09D 4/00; C09D 5/14; C09D 5/1618; C09D 7/1216; C09D 7/1275; C08K 2003/2241; C08K 2003/2248; C08K 3/22
See application file for complete search history.

(56) References Cited

U.S. PATENT DOCUMENTS

| | | | |
|---|---|---|---|
| 2009/0269504 A1* | 10/2009 | Liao | ........................ C08J 7/047 427/515 |
| 2011/0236284 A1 | 9/2011 | Hayakawa et al. | |
| 2013/0224096 A1 | 8/2013 | Fujii et al. | |
| 2014/0199357 A1 | 7/2014 | Hashimoto et al. | |
| 2015/0150265 A1 | 6/2015 | Okamoto et al. | |

FOREIGN PATENT DOCUMENTS

| | | |
|---|---|---|
| CN | 102911309 A | 2/2013 |
| EP | 0 051 930 A2 | 5/1982 |
| EP | 2 692 439 A1 | 2/2014 |
| JP | 2000/169755 A | 6/2000 |
| JP | 2003-275601 A | 9/2003 |
| JP | 2005-097400 A | 4/2005 |
| JP | 2006/199780 A | 8/2006 |
| JP | 2008-255101 A | 10/2008 |
| JP | 2009-035608 A | 2/2009 |
| JP | 2011-042642 A | 3/2011 |
| JP | 2011/092880 A | 5/2011 |
| JP | 2011-153163 A | 8/2011 |
| JP | 2012-210557 A | 11/2012 |
| JP | 2013-082654 A | 5/2013 |
| TW | 201223630 A1 | 6/2012 |
| WO | WO 2012/132716 A1 | 10/2012 |
| WO | WO 2013/054860 A1 | 4/2013 |

OTHER PUBLICATIONS

Extended European Search Report dated May 17, 2016 for corresponding European Application No. 14797282.2.
English translation of Chinese Office Action for corresponding Chinese Application No. 201480021675.2 dated Aug. 30, 2016.
Jin Yangzhi, "Waterborne Photo-Curable Paints", Paint & Coatings Industry, vol. 36, No. 6, Jun. 30, 2006, pp. 54-58.
International Search Report for corresponding International Application No. PCT/JP2014/001132 dated Jun. 3, 2014.
Form PCT/ISA/237 for corresponding International Application No. PCT/JP2014/001132 dated Jun. 3, 2014.

* cited by examiner

*Primary Examiner* — Frances Tischler
(74) *Attorney, Agent, or Firm* — Renner, Otto, Boisselle & Sklar, LLP

(57) ABSTRACT

A coating agent composition of the present invention contains photocatalyst particles composed of metal oxide in which an upper end potential of a valence band is 3 V (vs SHE) or more and a lower end potential of a conduction band is 0.16 V (vs SHE) or less. Moreover, the coating agent composition contains cuprous oxide particles, metal oxide particles without photocatalytic activity, a binder resin, and an organic solvent. Then, in 100 parts by mass of a non-volatile matter content of the coating agent composition, a content of the photocatalyst particles is 1 to 80 parts by mass, a content of the cuprous oxide particles is 0.1 to 5 parts by mass, and a total content of the photocatalyst particles and the metal oxide particles is 40 to 80 parts by mass.

8 Claims, No Drawings

COATING AGENT COMPOSITION AND ANTIBACTERIAL/ANTIVIRAL MEMBER

TECHNICAL FIELD

The present invention relates to a coating agent composition and an antibacterial/antiviral member. More specifically, the present invention relates to a coating agent composition capable of obtaining high antibacterial properties and antiviral properties, and to an antibacterial/antiviral member using the coating agent composition.

BACKGROUND ART

Various types of antibacterial members have been developed and turned into products to reduce microbes in the environment because of increased consumers' consciousness of hygiene. In general, antibacterial members used for interior members in houses or vehicles contain antibacterial materials such as silver and zinc (for example, refer to Patent Literatures 1 and 2). Moreover, these antibacterial materials are used in a state of being carried on porous zeolite, silica or the like. However, silver, zinc and the like have problems in points of price and ecotoxicity.

Accordingly, attempts are being made to use titanium oxide, which is cheap, abundant, and less ecotoxic, as an antibacterial material (for example, refer to Patent Literature 3). Titanium oxide is photocatalytically active, and the antibacterial action using the photocatalytic activity thereof is attracting attention.

CITATION LIST

Patent Literature

Patent Literature 1: Japanese Unexamined Patent Application Publication No. 2008-255101
Patent Literature 2: Japanese Unexamined Patent Application Publication No. 2011-42642
Patent Literature 3: Japanese Unexamined Patent Application Publication No. 2003-275601

SUMMARY OF INVENTION

However, in the conventional antibacterial materials, persistence of antibacterial performance is insufficient. Moreover, silver ions have a high effect of suppressing proliferation of bacteria such as colon *bacillus* and *staphylococcus aureus*; however, hardly have an effect of inactivating viruses such as an influenza virus and a norovirus. Moreover, a conventional photocatalyst requires ultraviolet rays as excitation light, and accordingly, is limited to use on a periphery of a window side, which is capable of being irradiated with sunlight.

The present invention has been made in consideration of such problems as described above, which is inherent in the prior art. Then, it is an object of the present invention to provide a coating agent composition, which expresses high antibacterial performance and antiviral performance even in an indoor space and allows these effects to persist for a long period of time, and to provide an antibacterial/antiviral member using the coating agent composition.

A coating agent composition according to a first aspect of the present invention contains photocatalyst particles composed of a metal oxide in which an upper end potential of a valence band is 3 V (vs SHE) or more and a lower end potential of a conduction band is 0.16 V (vs SHE) or less. Moreover, the coating agent composition contains cuprous oxide particles, metal oxide particles without photocatalytic activity, a binder resin, and an organic solvent. Then, in 100 parts by mass of a non-volatile matter content of the coating agent composition, a content of the photocatalyst particles is 1 to 80 parts by mass, a content of the cuprous oxide particles is 0.1 to 5 parts by mass, and a total content of the photocatalyst particles and the metal oxide particles is 40 to 80 parts by mass.

A coating agent composition according to a second aspect of the present invention is the coating agent composition according to the first aspect, wherein the binder resin is an active energy ray curing resin having an unsaturated hydrocarbon group. Moreover, average secondary particle diameters of the photocatalyst particles, the cuprous oxide particles and the metal oxide particles are 200 nm or less. Then, the organic solvent contains a glycol ether-based solvent, and further, a content of the glycol ether-based solvent with respect to 100 parts by mass of the non-volatile matter content of the coating agent composition is 10 parts by mass or more.

A coating agent composition according to a third aspect of the present invention is the coating agent composition according to the second aspect, wherein a photoinitiator with a molecular weight of 300 or more is contained by 0.1 to 5 parts by mass with respect to 100 parts by mass of the active energy ray curing resin.

A coating agent composition according to a fourth aspect of the present invention is the coating agent composition according to any one of the first to third aspects, wherein a dimethylsiloxane compound is contained by 0.1 to 5 parts by mass with respect to 100 parts by mass of the non-volatile matter content of the coating agent composition. Then, the dimethylsiloxane compound includes 20 to 150 units of a dimethylsiloxane component represented by (—Si(—CH$_3$)$_2$—O—) and the unsaturated hydrocarbon group.

A coating agent composition according to a fifth aspect of the present invention is the coating agent composition according to any one of the first to fourth aspects, wherein a fluorine-containing olefin compound is contained by 0.1 to 5 parts by mass with respect to 100 parts by mass of the non-volatile matter content of the coating agent composition. Then, the fluorine-containing olefin compound includes 2 to 10 units of a fluorine-containing olefin component represented by (—CF$_i$H$_j$—CF$_k$H$_l$—) (0≤i≤2, 0≤k≤2, i+k≥1, j=2−i, and l=2−k) and the unsaturated hydrocarbon group.

An antibacterial/antiviral member according to a sixth aspect of the present invention includes: a substrate; and a coating film which is provided on the substrate and contains the coating agent composition according to any one of the first to fifth aspects.

An antibacterial/antiviral member according to a seventh aspect of the present invention includes: a substrate; and a coating film which is provided on the substrate, contains the coating agent composition according to any one of the second to fifth aspects, and further, is cured by irradiating the coating agent composition with an ultraviolet ray or an electron beam.

An antibacterial/antiviral member according to an eighth aspect of the present invention is the antibacterial/antiviral member according to either one of the sixth and seventh aspects, wherein a film thickness of the coating film is 0.5 μm to 20 μm.

DESCRIPTION OF EMBODIMENTS

A description is made below in detail of a coating agent composition and an antibacterial/antiviral member according to an embodiment of the present invention.

[Coating Agent Composition]

The coating agent composition according to the embodiment of the present invention contains photocatalyst particles composed of a metal oxide in which an upper end potential of a valence band is 3 V (vs SHE) or more and a lower end potential of a conduction band is 0.16 V (vs SHE) or less. Moreover, the coating agent composition contains cuprous oxide particles, metal oxide particles without photocatalytic activity, a binder resin, and an organic solvent. Then, in 100 parts by mass of a non-volatile matter content of the coating agent composition, a content of the photocatalyst particles is 1 to 80 parts by mass, a content of the cuprous oxide particles is 0.1 to 5 parts by mass, and a total content of the photocatalyst particles and the metal oxide particles is 40 to 80 parts by mass.

As the photocatalyst particles contained in the coating agent composition, particles can be used, which are composed of the metal oxide in which the upper end potential of the valence band is 3 V (vs SHE) or more and the lower end potential of the conduction band is 0.16 V (vs SHE) or less. The particles of the metal oxide as described above are used, whereby electrons and holes are generated by absorption of excitation light having energy of a band gap thereof or more, further, recombination of the generated electrons and holes is reduced, and it becomes easy to cause a reduction/oxidation reaction on surfaces of the photocatalyst particles. As a result, it becomes easy for the coating agent composition to express high antibacterial properties and antiviral properties.

As the photocatalyst particles as described above, there are mentioned titanium oxide ($TiO_2$), tungsten oxide ($WO_3$), strontium titanate ($SrTiO_3$), niobium oxide ($Nb_2O_3$), zinc oxide (ZnO), tin oxide ($SnO_2$) and the like. Each type of these photocatalyst particles may be used singly, or two types or more thereof may be used in combination. Among them, titanium oxide is most preferable from viewpoints of stability to chemical agents and the like, availability, and the like.

As titanium oxide particles preferable as the photocatalyst particles, particles composed of anatase-type or rutile-type titanium oxide can be used. Moreover, particles in which the anatase-type titanium oxide and the rutile-type titanium oxide are mixed with each other can also be used. However, it is preferable to use the particles of the anatase-type titanium oxide as titanium oxide. This is because the anatase-type titanium oxide has a larger band gap than the rutile-type titanium oxide, and is excellent in photocatalytic properties.

Note that amorphous titanium oxide may be mixed with the particles of the anatase-type titanium oxide. However, the amorphous titanium oxide is poor in photocatalytic properties, and accordingly, it is preferable that a mixed quantity thereof be as small as possible. Moreover, in order to enhance the photocatalytic activity, particles in which oxides of iron and copper are supported on surfaces of titanium oxide may be used.

It is preferable that an average primary particle diameter of the photocatalyst particles be 2 nm to 80 nm. Even if the average primary particle diameter of the photocatalyst particles is out of this range, effects of the present embodiment can be exerted. However, in a case where the average primary particle diameter of the photocatalyst particles is less than 2 nm, then a surface area of each photocatalyst particle becomes excessively small, causing an apprehension that it may become difficult for the coating agent composition to express the photocatalytic activity. Meanwhile, in a case where the average primary particle diameter of the photocatalyst particles exceeds 80 nm, then it becomes difficult to sufficiently micronize the particles in a dispersion step to be described later. As a result, it is apprehended that the photocatalyst particles may become prone to be aggregated and deposited during the dispersion step or storage after the dispersion. Note that the average primary particle diameter of the photocatalyst particles can be obtained, for example, by measuring diameters of a plurality of the photocatalyst particles by using a transmission electron microscope (TEM).

Note that, preferably, the average primary particle diameter of the photocatalyst particles is 5 nm to 50 nm, more preferably, 5 nm to 30 nm. The average primary particle diameter of the photocatalyst particles is as described above, whereby it becomes possible to highly disperse the coating agent composition in the organic solvent while maintaining the surface area of the photocatalyst particles in a high state.

Moreover, the coating agent composition of the present embodiment also contains the cuprous oxide particles in addition to the photocatalyst particles. Here, while many types of a copper compound exhibiting the antibacterial activity have been reported heretofore, copper oxide (I) (cuprous oxide, $Cu_2O$) has higher antibacterial activity than copper oxide (II) (CuO). That is to say, cuprous oxide is prone to elute copper ions, and accordingly, the eluted copper ions contact microbes, and thereby combine with an enzyme and a protein to decrease activities thereof, and it becomes easy to inhibit metabolism of the microbes. Moreover, by a catalytic action of the eluted copper ions, oxygen in the air is converted into active oxygen, and it becomes easy to decompose organic matter of the microbes. Therefore, as the cuprous oxide particles, it is preferable to use particles of such copper oxide (I).

The cuprous oxide particles may have a crystal structure or an amorphous structure. Moreover, in a case where the cuprous oxide particles have a crystal structure, the cuprous oxide particles are coordinated with a protein, which composes the surfaces of the bacteria or the virus, regardless of the crystal structure, thereby change a structure of the protein, and can inactivate the bacteria or the virus. Therefore, the crystal structure of the cuprous oxide particles is not particularly limited.

It is preferable that an average primary particle diameter of the cuprous oxide particles be 2 nm to 80 nm. Even if the average primary particle diameter of the cuprous oxide particles is out of this range, the effects of the present embodiment can be exerted. However, in a case where the average primary particle diameter of the cuprous oxide particles is less than 2 nm, then a surface area of each cuprous oxide particle becomes excessively small, causing an apprehension that it may become difficult to elute the copper ions. Meanwhile, in a case where the average primary particle diameter of the cuprous oxide particles exceeds 80 nm, then it becomes difficult to sufficiently micronize the particles in the dispersion step to be described later. As a result, it is apprehended that the cuprous oxide particles may become prone to be aggregated and deposited during the dispersion step or the storage after the dispersion. Note that the average primary particle diameter of the cuprous oxide particles can be obtained by using the transmission electron microscope in a similar way to the photocatalyst particles.

Note that, preferably, the average primary particle diameter of the cuprous oxide particles is 10 nm to 70 nm, more preferably, 30 nm to 60 nm. The average primary particle diameter of the cuprous oxide particles is as described above, whereby it becomes possible to highly disperse the coating agent composition in the organic solvent while maintaining the surface area of the cuprous oxide particles in a high state.

As mentioned above, it is necessary that the lower end potential of the conduction band in the photocatalyst particles be 0.16 V (vs. SHE, pH=0) or less. 0.16 V (vs. SHE) is equal to an oxidation-reduction potential between cuprous ions and cupric ions. Therefore, in a case where the lower end potential of the conduction band is 0.16 V or less, electrons excited in the conduction band of the photocatalyst has reducing power as high as being capable of reducing the cupric ions, and accordingly, copper oxide (II) is easily reduced to become copper oxide (I).

Moreover, as mentioned above, it is necessary that the upper end potential of the valence band in the photocatalyst particles be 3 V (vs. SHE, pH=0) or more. A valence band potential of the photocatalyst particles affects strength of oxidizing power in an event where the photocatalyst is excited, and the oxidizing power becomes stronger as the valence band potential is higher. In particular, if the upper end potential of the valence band is 3 V (vs. SHE) or more, then the bacteria and the virus are oxidatively decomposed effectively, and the antibacterial action and the antiviral action are increased. However, in a case where the valence band potential is high and the lower end potential of the conduction band is low, then the band gap becomes large, and energy required for the excitation of the photocatalyst is increased. In this case, the photocatalyst is excited only by light with a short wavelength, and an environmental condition where the coating agent composition is usable is sometimes limited. Therefore, it is preferable that the upper end potential of the valence band in the photocatalyst particles be 3.2 V (vs. SHE, pH=0) or less. If the upper end potential of the valence band in the photocatalyst particles is 3.2 V or less, then a potential difference thereof from the oxidation-reduction potential between the cuprous ions and the cupric ions becomes 3.0 V or less, and it becomes possible to excite the photocatalyst particles by light of the visible light region.

Moreover, the coating agent composition of the present embodiment also contains the metal oxide particles without the photocatalytic activity in addition to the photocatalyst particles and the cuprous oxide particles. In a case where a content of the photocatalyst particles in a coating film is large, then in the event where the photocatalyst particles are photoexcited, it is possible that the binder resin as organic matter may be oxidatively decomposed, causing problems such as whitening, crack and exfoliation to the coating film. Therefore, by the fact that the metal oxide particles without the photocatalytic activity are added, even if a part of the binder resin is oxidatively decomposed by the photocatalyst, such a defect caused thereby is not expanded, thus making it possible to suppress the occurrence of the whitening, the crack, the exfoliation and the like, which are regarded as the problems. The metal oxide particles as described above are not particularly limited as long as not having the photocatalytic activity; however, silicon oxide ($SiO_2$), aluminum oxide ($Al_2O_3$) and the like can be used. Each type of these metal oxide particles may be used singly, or two types or more thereof may be used in combination.

Moreover, the coating agent composition of the present embodiment contains the binder resin. The binder resin is not particularly limited as long as stability, antibacterial properties and antiviral properties of the coating film, which are obtained from the coating agent composition, are ensured. As the binder resin, for example, there can be used alkyd resin, acrylic resin, melamine resin, urethane resin, epoxy resin, silicon resin and the like. Moreover, there can also be used polyester resin, polyamide acid resin, polyimide resin, styrene-maleic acid resin, styrene-maleic anhydride resin and the like. Furthermore, varieties of acrylic acid monomers and acrylate monomers are also applicable. As resins and monomers, which are particularly preferable as the binder resin, there are mentioned the urethane resin, the acrylic resin, the acrylic monomer, the polyamide acid resin, the polyimide resin, the styrene-malic acid resin, and the styrene-maleic anhydride resin. Each type of the binder resins may be used singly, or two types or more thereof may be used in combination.

As the binder resin, it is particularly preferable to use active energy ray curing resin, which has an unsaturated hydrocarbon group, and cures by being irradiated with an active energy ray. The active energy ray curing resin does not require large energy in an event of being cured, and has an advantage in being excellent in stability of the coating film after the curing. As the active energy ray curing resin as described above, polyfunctional (meth)acrylate and the like are mentioned. Specifically, there are mentioned pentaerythritols such as pentaerythritol tri(meth)acrylate, dipentaerythritol penta(meth)acrylate, and dipentaerythritol tetra(meth)acrylate. Moreover, there can also be mentioned pentaerythritols such as dipentaerythritol tri(meth)acrylate and dipentaerythritol di(meth)acrylate. Furthermore, there can also be mentioned methylols such as trimethylolpropane di(meth)acrylate and epoxy acrylates such as bisphenol A diepoxy acrylate. As the active energy ray curing resin, pentaerythritol tri(meth)acrylate and dipentaerythritol penta (meth)acrylate are preferable. Each type of such active energy ray curing resins may be used singly, or two types or more thereof may be used in combination.

The coating agent composition of the present embodiment contains the organic solvent in order to disperse the photocatalyst particles, the cuprous oxide particles and the metal oxide particles and to adjust viscosity and solid content of the coating agent composition. As the organic solvent, for example, there are mentioned aromatic hydrocarbons (toluene, xylene and the like), alcohols (methanol, ethanol, isopropyl alcohol and the like), and ketones (acetone, methylethylketone, methylisobutylketone and the like). Moreover, there are mentioned aliphatic hydrocarbons (hexane, heptane and the like), ethers (tetrahydrofuran and the like), amide solvents (N,N-dimethylformamide (DMF) and dimethylacetamide (DMAc) and the like), and nitrile solvents. Each type of these organic solvents may be used singly, or two types or more thereof may be used in combination.

Here, the surfaces of the photocatalyst particles, the cuprous oxide particles and the metal oxide particles without the photocatalytic activity have high polarity. Therefore, it is preferable to use an organic solvent having high polarity in order to suppress the aggregation of these particles, and to disperse the particles so that average secondary particle diameters thereof can become 200 nm or less. As the organic solvent having high polarity, which is as described above, for example, it is preferable to use alcohol-based, ketone-based and nitrile-based organic solvents. Specifically, there can be used: primary alcohol such as methanol, ethanol and propanol; secondary alcohol such as 2-propanol and 2-butanol; and tertiary alcohol such as 1,1,1-trimethylmethanol. Moreover, there can also be used: polyalcohol such as ethylene glycol and propylene glycol; dialkylketone such as acetone; a nitrile-based solvent such as acetonitrile, propionitrile and pivalonitrile.

In the coating agent composition according to the present embodiment, it is necessary that the content of the photocatalyst particles be 1 to 80 parts by mass in 100 parts by mass of the non-volatile matter content of the coating agent composition. That is to say, it is necessary that the photocatalyst particles be contained by 1 to 80 parts by mass in 100 parts by mass of the solid content of the coating agent composition, which excludes the organic solvent. If the content of the photocatalyst particles is less than 1 parts by mass, then the photocatalytic activity is insufficient, and it is apprehended that antibacterial performance and antiviral performance may become insufficient. Meanwhile, if the content of the photocatalyst particles exceeds 80 parts by mass, then the obtained coating film becomes too porous, and accordingly, it is apprehended that this may adversely affect strength, durability, adherence and the like of the coating film. Moreover, in a case of using the active energy ray curing resin as the binder resin, it is apprehended that curing thereof may become insufficient since the photocatalyst particles absorb active energy rays such as an ultraviolet ray and an electron beam.

Note that, in 100 parts by mass of the non-volatile matter content of the coating agent composition, the content of the photocatalyst particles is preferably 10 to 70 parts by mass, more preferably 10 to 50 parts by mass. The content of the photocatalyst particles stays within this range, whereby it becomes possible to enhance the strength, durability and adherence of the coating film while ensuring sufficient antibacterial performance and antiviral performance.

Moreover, in the coating agent composition according to the present embodiment, it is necessary that the content of the cuprous oxide particles be 0.1 to 5 parts by mass in 100 parts by mass of the non-volatile matter content of the coating agent composition. That is to say, it is necessary that the cuprous oxide particles be contained by 0.1 to 5 parts by mass in 100 parts by mass of the solid content of the coating agent composition, which excludes the organic solvent component. If the content of the cuprous oxide particles is less than 0.1 parts by mass, then such denaturation of the protein does not sufficiently occur on the surface of the formed coating film, and it is apprehended that the antibacterial performance and the antiviral performance may become insufficient. Meanwhile, if the content of the cuprous oxide particles exceeds 5 parts by mass, then an influence of coloring by the cuprous oxide particles becomes large, and it is apprehended that an appearance may be damaged. Moreover, in the case of using the active energy ray curing resin as the binder resin, it is apprehended that the curing thereof may become insufficient since the photocatalyst particles shield the active energy rays such as an ultraviolet ray and an electron beam.

Note that, in 100 parts by mass of the non-volatile matter content of the coating agent composition, the content of the cuprous oxide particles is preferably 0.1 to 3.0 parts by mass, more preferably 0.1 to 1.0 parts by mass. The content of the photocatalyst particles stays within this range, whereby it becomes possible to enhance physical properties of the coating film and suppress the unnecessary coloring while ensuring the sufficient antibacterial performance and antiviral performance.

Here, in order that the surface of the coating film composed of the coating agent composition can express high antibacterial properties and antiviral properties, it is necessary that the photocatalyst particles and the cuprous oxide particles, which act on the bacteria and the virus, should not be completely covered with the binder resin. That is to say, it is necessary that the photocatalyst particles and the cuprous oxide particles be exposed to the surface of the coating film at least partially. Therefore, important is a mass ratio of the binder resin and the particles in the solid content that forms the coating film.

In the present embodiment, in 100 parts by mass of the non-volatile matter content of the coating agent composition, the total content of the photocatalyst particles and the metal oxide particles is 40 to 80 parts by mass. That is to say, it is necessary that the photocatalyst particles and the metal oxide particles be contained by 40 to 80 parts by mass in 100 parts by mass of the solid content of the coating agent composition, which excludes the organic solvent. If the total content of the photocatalyst particles and the metal oxide particles is less than 40 parts by mass, then the antibacterial performance and the antiviral performance decrease significantly. Meanwhile, if the total content of the photocatalyst particles and the metal oxide particles exceeds 80 parts by mass, then the obtained coating film becomes too porous, and accordingly, it is apprehended that this may adversely affect the strength, durability, adherence and the like of the coating film.

Note that, in 100 parts by mass of the non-volatile matter content of the coating agent composition, the total content of the photocatalyst particles and the metal oxide particles is preferably 50 to 75 parts by mass, more preferably 55 to 70 parts by mass. The total content of the photocatalyst particles and the metal oxide particles stays within this range, whereby it becomes possible to enhance the physical properties of the coating film while ensuring the sufficient antibacterial performance and antiviral performance.

Note that the non-volatile matter content in this description can be measured in conformity with the Japanese Industrial Standard JIS K5601-1-2 (Testing methods for paint components—Part 1: General rule—Section 2: Determination of non-volatile matter content). Then, elementary analysis is performed from the non-volatile matter content, whereby the contents of the photocatalyst, the cuprous oxide and the metal oxide that does not have the photocatalytic activity can be obtained.

Here, in a case of using the active energy ray curing resin as the binder resin, it is preferable that the average secondary particle diameters of the photocatalyst particles, the cuprous oxide particles and the metal oxide particles be 200 nm or less in the coating agent composition. If the average secondary particle diameters exceed 200 nm, then the active energy rays such as the ultraviolet ray and the electron beam, which are to be irradiated for the curing, are scattered and reflected, and accordingly, it is apprehended that the curing may become insufficient. Note that a lower limit of the average secondary particle diameters of the photocatalyst particles, the cuprous oxide particles and the metal oxide particles is not particularly limited; however, can be set at 50 nm for example. If the average secondary particle diameters of these particles are 50 nm or more, then the crystal structures in these particles are suppressed from being broken, thus making it possible to enhance the photocatalytic activity, the antibacterial properties and the antiviral properties.

Note that, in this description, as the average secondary particle diameters of the photocatalyst particles, the cuprous oxide particles and the metal oxide particles, average secondary particle diameters are employed, which are measured by the dynamic light scattering and are obtained by the cumulant analysis method.

Moreover, in the case of using the active energy ray curing resin as the binder resin, it is preferable to add a glycol ether-based solvent to the coating agent composition. Then, it is preferable that a content of the glycol ether-based solvent to 100 parts by mass of the non-volatile matter content of the coating agent composition be 10 parts by mass or more. That is to say, it is preferable that 10 parts by mass or more of the glycol ether-based solvent be contained as a part of the organic solvent with respect to 100 parts by mass of the solid content of the coating agent composition, which excludes the organic solvent.

In a case of using a high-polarity solvent as the organic solvent, the solvent is poor in solubility in the active energy ray curing resin composed of resin having the unsaturated hydrocarbon group. That is to say, polarity of the unsaturated hydrocarbon group is low, and accordingly, in the case of using the high-polarity solvent, solubility of the active energy ray curing resin having the unsaturated hydrocarbon group decreases. However, in the case of using the low-polarity solvent as the organic solvent as mentioned above, it is apprehended that the aggregation of the photocatalyst particles may occur. Therefore, the glycol ether-based solvent that becomes a good solvent for both of the above is added, whereby it becomes possible to suppress the aggregation of the photocatalyst particles or the like while enhancing the solubility of the active energy ray curing resin.

Note that the content of the glycol ether-based solvent is preferably 10 to 1000 parts by mass, more preferably 100 to 800 parts by mass with respect to 100 parts by mass of the non-volatile matter content of the coating agent composition. The content of the glycol ether-based solvent stays within this range, whereby it becomes possible to enhance the solubility of the active energy ray curing resin and to enhance the physical properties of the coating film while suppressing the aggregation of the photocatalyst particles, the cuprous oxide particles and the metal oxide particles.

As the glycol ether-based solvent, there are mentioned diethylene glycol monomethyl ether, triethylene glycol monomethyl ether, propylene glycol monomethyl ether and the like. Moreover, there are mentioned 3-methoxy-3-methyl-1-butanol, hexyl diglycol and the like. Note that each type of these glycol ether-based solvents may be used singly, or two types or more thereof may be used in combination.

It is preferable that the binder resin in the coating agent composition of the present embodiment contain the active energy ray curing resin, and further, that a photoinitiator be used in the case of curing the coating agent composition by ultraviolet irradiation. That is to say, it is preferable to add a photoinitiator, which causes a reaction by the ultraviolet rays and discharges radicals, to the coating agent composition.

As the photoinitiator, a benzoin compound with a carbon number of 14 to 18 can be used. As the benzoin compound, for example, there are mentioned benzoin, benzoin methyl ether, benzoin ethyl ether, benzoin propyl ether, and benzoin isobutyl ether. Moreover, as the photoinitiator, an acetophenone compound with a carbon number of 8 to 18 can be used. As the acetophenone compound, for example, there are mentioned acetophenone, 2,2-diethoxy-2-phenylacetophenone, 2,2-diethoxy-2-phenylacetophenone, and 1,1-dichloroacetophenone. Moreover, there can also be mentioned 2-hydroxy-2-methyl-phenylpropane-1-on, diethoxy acetophenone, 1-hydroxycyclohexyl phenylketone, and 2-methyl-1-[4-(methylthio)phenyl]-2-morphorinopropane-1-on. As the photoinitiator, an anthraquinone compound with a carbon number of 14 to 19 can be used. As the anthraquinone compound, for example, there are mentioned 2-ethyl anthraquinone, 2-t-butyl anthraquinone, 2-chloro anthraquinone, and 2-amyl anthraquinone. As the photoinitiator, a thioxanthone compound with a carbon number of 13 to 17 can be used. As the thioxanthone compound, for example, there are mentioned 2,4-diethyl thioxanthone, 2-isopropyl thioxanthone, and 2-chloro thioxanthone. As the photoinitiator, a ketal compound with a carbon number of 16 to 17 can be used. As the ketal compound, for example, acetophenone dimethyl ketal and benzyl dimethyl ketal are mentioned. As the photoinitiator, a benzophenone compound with a carbon number of 13 to 21 can be used. As the benzophenone compound, for example, there are mentioned benzophenone, 4-benzoyl-4'-methyl diphenylsulfide, and 4-4'-bismethyl aminobenzophenone. As the photoinitiator, a phosphine oxide compound with a carbon number of 22 to 28 can be used. As the phosphine oxide compound, for example, there are mentioned 2,4,6-trimethylbenzoyl diphenylphosphine oxide, and bis-(2,6-dimethoxybenzoyl)-2,4,4-trimethylpentyl phosphine oxide. Moreover, as the phosphine oxide compound, bis(2,4,6-trimethylbenzoyl)-phenyl phosphine oxide is mentioned. Each type of these photoinitiators may be used singly, or two types or more thereof may be used in combination.

Here, it is preferable that a molecular weight of the photoinitiator contained in the coating agent composition of the present embodiment be 300 or more. As the photoinitiator, those with a molecular weight of less than 300 can also be used. However, in a case where the coating agent composition contains the glycol ether-based solvent, it is necessary to evaporate the solvent by heating the coating agent composition before the curing. In this event, if the molecular weight of the photoinitiator is less than 300, then the photoinitiator volatilizes in the event of the heating, and it is possible that, at a time of the curing in the ultraviolet irradiation that follows, the content of the photoinitiator may become insufficient to cause a curing defect.

Moreover, in the coating agent composition, it is preferable that the photoinitiator be contained by 0.1 to 5 parts by mass with respect to 100 parts by mass of the active energy ray curing resin having the unsaturated hydrocarbon group. Such an additional amount of the photoinitiator stays within this range, whereby radicals of which amount is necessary to cure the active energy ray curing resin are generated, and the resin is cured sufficiently. Moreover, it also becomes to suppress yellowing and the like of the coating film, which are caused by the photoinitiator.

It is preferable that the coating agent composition of the present embodiment contain a dimethylsiloxane compound including 20 to 150 units of a dimethylsiloxane component represented by (—Si(—CH$_3$)$_2$—O—) and the unsaturated hydrocarbon group. The coating agent composition of the present embodiment contains the dimethylsiloxane compound, whereby surface free energy of the obtained coating film decreases to a large extent, and it becomes possible to suppress adhesion of dirt.

Here, if the surface of the coating film is covered with dirt, then the contact between the bacteria and the virus and the photocatalyst particles and the cuprous oxide particles is inhibited, and further, the irradiation of the excitation light onto the photocatalyst particles is inhibited. Therefore, the antibacterial/antiviral function by the photocatalyst particles and the cuprous oxide particles decreases to a large extent. However, the coating agent composition contains the dimethylsiloxane compound, whereby the dimethylsiloxane compound decreases the surface free energy of the coating film. Therefore, the decrease of the antibacterial/antiviral function, which is caused by the adhesion of the dirt, can be suppressed, and in addition, it becomes easy to remove the adhered dirt, and it becomes easy to recover the antibacterial/antiviral function.

Note that, preferably, the dimethylsiloxane compound is contained by 0.1 to 5 parts by mass with respect to 100 parts by mass of the non-volatile matter content of the coating agent composition. That is to say, preferably, the dimethylsiloxane compound is contained by 0.1 to 5 parts by mass with respect to 100 parts by mass of the solid content of the coating agent composition, which excludes the organic solvent. Such an additional amount of the dimethylsiloxane compound stays within this range, whereby it becomes possible to sufficiently decrease the surface free energy of the coating film. Moreover, the dimethylsiloxane compound, which is excessive, can be prevented from covering the surfaces of the photocatalyst particles and the cuprous oxide particles and from inhibiting the antibacterial/antiviral function.

In order to express such a decrease action of the surface free energy by the dimethylsiloxane compound, it is preferable that 20 units or more of the dimethylsiloxane component represented by (—Si(—CH$_3$)$_2$—O—) be contained. Meanwhile, in a case where the units of the dimethylsiloxane component are 150 units or less, then compatibility thereof with the active energy ray curing resin can be ensured, and the coating agent composition can be suppressed from becoming clouded by phase separation, and the curing of the active energy ray curing resin can be suppressed from being inhibited.

Moreover, it is preferable that the dimethylsiloxane compound have the unsaturated hydrocarbon group. The dimethylsiloxane compound as described above reacts with the active energy ray curing resin having the unsaturated hydrocarbon group, and is incorporated into a resin skeleton. Therefore, it becomes possible to maintain the surface free energy decrease action of the coating film, which is brought by the dimethylsiloxane compound, for a long time under a variety of usage environments. Note that the dimethylsiloxane compound for use in the present embodiment can exert the surface free energy decrease function even if the dimethylsiloxane compound does not have the unsaturated hydrocarbon group. However, in a case where the dimethylsiloxane compound does not have the unsaturated hydrocarbon group, the dimethylsiloxane compound does not react with the active energy ray curing resin, and accordingly, is not incorporated into the resin skeleton, and is liberated in the coating film. The liberated dimethylsiloxane compound bleeds to the surface of the coating film, and accordingly, is easily lost from the coating film in the variety of usage environments, and the surface free energy decrease function of the coating film is lost. Moreover, it is apprehended that the dimethylsiloxane compound, which bleeds to the surface of the coating film, may cover the surfaces of the photocatalyst particles and the cuprous oxide particles, and may inhibit the antibacterial/antiviral function.

It is preferable that the coating agent composition of the present embodiment contain a fluorine-containing olefin compound including 2 to 10 units of a fluorine-containing olefin component represented by (—CF$_i$H$_j$—CF$_k$H$_l$—) and the unsaturated hydrocarbon group. Here, the general formula (—CF$_i$H$_j$—CF$_k$H$_l$—) satisfies relationships of: $0 \leq i \leq 2$; $0 \leq k \leq 2$; $i+k \geq 1$; $j=2-i$; and $l=2-k$. The fluorine-containing olefin compound is contained, whereby the surface free energy of the obtained coating film decreases to a large extent, and it becomes possible to suppress the adhesion of the dirt.

Here, if the surface of the coating film is covered with the dirt, then the contact between the bacteria and the virus and the photocatalyst particles and the cuprous oxide particles is inhibited, and further, the irradiation of the excitation light onto the photocatalyst particles is inhibited. Therefore, the antibacterial/antiviral function by the photocatalyst particles and the cuprous oxide particles decreases to a large extent. However, the coating agent composition contains the fluorine-containing olefin compound, whereby the fluorine-containing olefin compound decreases the surface free energy of the coating film. Therefore, the decrease of the antibacterial/antiviral function, which is caused by the adhesion of the dirt, can be suppressed, and in addition, it becomes easy to remove the adhered dirt, and it becomes easy to recover the antibacterial/antiviral function.

Note that, preferably, the fluorine-containing olefin compound is contained by 0.1 to 5 parts by mass with respect to 100 parts by mass of the non-volatile matter content of the coating agent composition. That is to say, preferably, the fluorine-containing olefin compound is contained by 0.1 to 5 parts by mass with respect to 100 parts by mass of the solid content of the coating agent composition, which excludes the organic solvent. Such an additional amount of the fluorine-containing olefin compound stays within this range, whereby it becomes possible to sufficiently decrease the surface free energy of the coating film. Moreover, the fluorine-containing olefin compound, which is excessive, can be prevented from covering the surfaces of the photocatalyst particles and the cuprous oxide particles and from inhibiting the antibacterial/antiviral function.

In order to express such a decrease action of the surface free energy by the fluorine-containing olefin compound, it is preferable that 2 units or more of the fluorine-containing olefin component represented by (—CF$_i$H$_j$—CF$_k$H$_l$—) be contained. Meanwhile, in a case where the units of the fluorine-containing olefin component are 10 units or less, then compatibility thereof with the active energy ray curing resin can be ensured, and the coating agent composition can be suppressed from becoming clouded by the phase separation, and the curing of the active energy ray curing resin can be suppressed from being inhibited.

Moreover, it is preferable that the fluorine-containing olefin compound have the unsaturated hydrocarbon group. The fluorine-containing olefin compound as described above reacts with the active energy ray curing resin having the unsaturated hydrocarbon group, and is incorporated into the resin skeleton. Therefore, it becomes possible to maintain the surface free energy decrease action of the coating film, which is brought by the fluorine-containing olefin compound, for a long time under the variety of usage environments. Note that the fluorine-containing olefin compound for use in the present embodiment can exert the surface free energy decrease function even if the fluorine-containing olefin compound does not have the unsaturated hydrocarbon group. However, in a case where the fluorine-containing olefin compound does not have the unsaturated hydrocarbon group, the fluorine-containing olefin compound does not react with the active energy ray curing resin, and accordingly, is not incorporated into the resin skeleton, and is liberated in the coating film. The liberated fluorine-containing olefin compound bleeds to the surface of the coating film, and accordingly, is easily lost from the coating film in the variety of usage environments, and the surface free energy decrease function of the coating film is lost. Moreover, it is apprehended that the fluorine-containing olefin compound, which bleeds to the surface of the coating film, may cover the surfaces of the photocatalyst particles and the cuprous oxide particles, and may inhibit the antibacterial/antiviral function.

According to needs, the coating agent composition of the present embodiment can contain a dispersant for inorganic or organic fine particles, and an additive such as an antifoaming agent, a silane coupling agent, a thixotropic agent (thickener), an antioxidant and an ultraviolet absorber. A usage amount of each additive is preferably 5% by mass or less, more preferably 2% by mass or less with respect to a whole of the coating agent composition of the present embodiment.

As the dispersant, an organic dispersant and an inorganic dispersant can be used. As the organic dispersant, a polymer dispersant with a weight average molecular weight ranging from 2000 to 500000 and a low molecular dispersant with a weight average molecular weight of less than 2000 are mentioned.

As the thixotropic agent, an inorganic thixotropic agent and an organic thixotropic agent can be used. As the inorganic thixotropic agent, there are mentioned bentonite, organic-treated bentonite, ultrafine surface-treated calcium carbonate, and the like. Moreover, as the organic thixotropic agent, there are mentioned hydrogenated castor oil wax, calcium stearate, aluminum oleate, polymerized linseed oil and the like.

As the antioxidant, hindered phenol-based and amine-based antioxidants can be used. As the hindered phenol-based antioxidant, triethyleneglycol-bis-[3-(3-t-butyl-5-methyl-4-hydroxyphenyl)propionate] is mentioned. Moreover, 1,6-hexanediol-bis[3-(3,5-di-t-butyl-4-hydroxyphenyl)propionate] is mentioned. Furthermore, octadecyl-3-(3,5-di-t-butyl-4-hydroxyphenyl)propionate and 3,5-di-t-butyl-4-hydroxybenzyl phosphonate-diethyl ester are mentioned. As the amine-based antioxidant, n-butylamine, triethylamine, diethylaminomethyl methacrylate and the like are mentioned.

As the ultraviolet absorber, benzotriazole, triazine, benzophenone, oxanilide, and the like can be used. As the benzotriazole, 2-(5-methyl-2-hydroxyphenyl)benzotriazole and 2-(3,5-di-t-butyl-2-hydroxyphenyl)benzotriazole are mentioned. Moreover, 2-(3,5-di-t-butyl-2-hydroxyphenyl)-5-chlorobenzotriazole, 2-(3,5-di-t-amyl-2-hydroxyphenyl) benzotriazole and the like are also mentioned. As the triazine, 2-(4,6-diphenyl-1,3,5-triazine-2-yl)-5-[(hexyl)oxy]-phenol and the like are mentioned. As the benzophenone, 2-hydroxy-4-n-octyloxybenzophenone and the like are mentioned. As the oxanilide, 2-ethoxy-2'-ethyl oxalic acid bisanilide and the like are mentioned.

[Production Method of Coating Agent Composition]

Next, a description is made of a production method of the coating agent composition of the present embodiment. The coating agent composition of the present embodiment can be prepared by mixing the photocatalyst particles, the cuprous oxide particles, the metal oxide particles without the photocatalytic activity, the binder resin, and the organic solvent, which are mentioned above, with one another.

Here, in a case where the photocatalyst particles and the cuprous oxide particles are highly dispersed in the coating agent composition, film characteristics of the coating film obtained from the coating agent composition become good. Moreover, the surface areas of these particles are increased, and a contact ratio thereof with the bacterial and the virus is enhanced, and accordingly, the antibacterial properties and the antiviral properties become good. Therefore, it is preferable to use a method that enables the photocatalyst particles and the cuprous oxide particles to be highly dispersed. That is to say, a method as follows is preferable, which is of first preparing a dispersion liquid of the photocatalyst particles and a dispersion liquid of the cuprous oxide particles, and thereafter, mixing these with the metal oxide particles without the photocatalytic activity, the binder resin and the organic solvent.

<Preparation of Photocatalyst Particle Dispersion Liquid>

Such a photocatalyst particle dispersion liquid contains the photocatalyst particles, the dispersant, and the organic solvent, which are mentioned above. Then, it is possible to prepare the photocatalyst particle dispersion liquid by mixing the photocatalyst particles, the dispersant and the organic solvent with one another, and by highly dispersing the photocatalyst particles into the organic solvent. Therefore, as the production method of the photocatalyst particle dispersion liquid, any method can be used as long as being capable of highly dispersing the photocatalyst particles.

However, from a viewpoint of enhancing dispersibility of the photocatalyst particles, it is preferable to perform a dispersion step of the photocatalyst particles by separating the dispersion step into a pre-dispersion treatment and a main dispersion treatment. In such a way, the surfaces of the photocatalyst particles get wet, and air layers of the surfaces are replaced by the organic solvent, and accordingly, the dispersion progresses rapidly in a main dispersion treatment that follows. If this pre-dispersion treatment is insufficient, then the progress of the dispersion is slow, and it is apprehended that an unnecessary mechanical impact may be applied to the photocatalyst particles. It is apprehended that, as a result, the crystal structure itself of the photocatalyst particles may be broken, resulting in a dispersion in which stability decreases.

The pre-dispersion treatment can be performed by using a common dissolver for stirring. From the viewpoint of easily wetting the surfaces of the photocatalyst particles, it is preferable to use a high-speed stirrer for stirring. For example, T. K. Homomixer, T. K. Robomix, or T. K. Filmix (trade names, manufactured by PRIMIX Corporation) may be used as the high-speed stirrer. Alternatively, CLEAMIX (registered trademark) (trade name, manufactured by M Technique Co., Ltd.) or Ultradisper (trade name, manufactured by Asada Iron Works Co., Ltd.) may also be used.

A dispersing apparatus used in the main dispersion treatment may be a kneading machine such as a kneader, a two-roll mill, a three-roll mill, SS5 (trade name, manufactured by M Technique Co., Ltd.), and MIRACLE KCK (registered trademark) (trade name, manufactured by Asada Iron Works Co., Ltd.). Other examples of the dispersing apparatus include a ultrasonic dispersing machine, Microfluidizer (trade name, manufactured by Mizuho Industrial Co., Ltd.) as a high-pressure homogenizer, and NanoVater (registered trademark) (trade name, manufactured by Yoshida Kikai Co., Ltd.). Further, Starburst (registered trademark) (trade name, manufactured by Sugino Machine Ltd.) or G-smasher (trade name, Rix Corporation) may also be used. When bead media such as glass or zircon are used, a ball mill, a bead mill, a sand mill, a horizontal media mill dispersing apparatus, or a colloid mill may be used. Bead media used in a bead mill preferably have a diameter of 1 mm or smaller, more preferably have a diameter of 0.5 mm or smaller. Note that a dispersion time of each of the pre-dispersion treatment and the main dispersion treatment just needs to be appropriately adjusted for each of the dispersing apparatuses and the media so that the photocatalyst particles can be highly dispersed in the organic solvent together with the dispersant.

In the process of supplying the processed liquid subjected to the pre-dispersion treatment to the aforementioned dispersing apparatus, the processed liquid may be simultaneously stirred sufficiently with a high-speed stirrer or the like. This can shorten the process time.

Note that, as mentioned above, from the viewpoint of enhancing the dispersibility of the photocatalyst particles and improving the film characteristics, it is preferable to set the average secondary particle diameter of the photocatalyst particles in the photocatalyst particle dispersion liquid at 200 nm or less.

<Preparation of Cuprous Oxide Particle Dispersion Liquid>

Such a cuprous oxide particle dispersion liquid contains the cuprous oxide particles, the dispersant, and the organic solvent, which are mentioned above. Then, it is possible to prepare the cuprous oxide particle dispersion liquid by mixing the cuprous oxide particles, the dispersant and the organic solvent with one another, and by highly dispersing the cuprous oxide particles into the organic solvent. Therefore, any method can be used as long as being capable of highly dispersing the cuprous oxide particles. However, from a viewpoint of enhancing dispersibility of the cuprous oxide particles, it is preferable to perform a dispersion step of the cuprous oxide particles by separating the dispersion step into a pre-dispersion treatment and a main dispersion treatment in a similar way to the photocatalyst particle dispersion liquid. In such a way, the surfaces of the cuprous oxide particles get wet, and air layers of the surfaces are replaced by the organic solvent, and accordingly, the dispersion progresses rapidly in the main dispersion treatment that follows.

Moreover, in a similar way to the above-mentioned photocatalyst particle dispersion liquid, from the viewpoint of enhancing the dispersibility of the cuprous oxide particles and improving the film characteristics, it is preferable to set the average secondary particle diameter of the cuprous oxide particles in the cuprous oxide particle dispersion liquid at 200 nm or less.

<Preparation of Coating Agent Composition>

The coating agent composition according to the present embodiment can be prepared by mixing the metal oxide particles, the binder resin and the organic solvent in addition to the above-mentioned photocatalyst particle dispersion liquid and cuprous oxide particle dispersion liquid. Note that, in a mixing step, for example, such mixing is possible by using the above-mentioned dissolver or high-speed stirrer. Moreover, according to needs, the dimethylsiloxane compound, the fluorine-containing olefin compound and the additive may be mixed.

[Antibacterial/Antiviral Member]

The antibacterial/antiviral member according to the present embodiment includes: a substrate; and the coating film, which is provided on the substrate and contains the coating agent composition. As mentioned above, the coating agent composition of the present embodiment has high antibacterial properties/antiviral properties, which result from the photocatalyst particles and the cuprous oxide particles.

In the present embodiment, the substrate may basically include any material such as an organic polymer, ceramics, metal, glass, plastic, decorative plywood, or composites of these materials. The shape of the substrate is not particularly limited and may be a simple or complicated shape such as a plate shape, a spherical shape, a round column, a cylindrical shape, a rod shape, a prism, or a hollow prism. Alternatively, the substrate may be a porous body such as a filter.

The substrate is preferably used for construction materials such as ceiling materials, tiles, glass, wallpaper, wall materials, floors, or fixture materials, interior materials for vehicles (instrument panels, seats, or ceilings), electrical appliances such as refrigerators or air conditioners, textile products such as clothing or curtains, industrial equipment, or medical equipment. The substrate is also preferably used for doors, door handles, pulls, railings, interior counters, furniture, kitchens, toilets, bath rooms, lighting fixtures, touch panels, switches, or sheets used therein. The coating film including the coating agent composition according to the present embodiment is particularly effectively used for surfaces on which human bodies or the like frequently touch due to the high antibacterial/antiviral property of the coating film.

The antibacterial/antiviral member according to the present embodiment may be applied to filters for air purifiers or for air conditioners. The antibacterial/antiviral member is effective when used not only in houses but also in other places where large numbers of people use such as hospitals and homes for elderly people, and public transportation such as trains, buses, and planes, since the use of the antibacterial/antiviral member can reduce the risk of a bacterial or viral infection.

The antibacterial/antiviral member according to the present embodiment can be obtained by applying the coating agent composition onto the substrate, followed by drying. An application method and a drying condition in this event are not particularly limited. As a method of applying the coating agent composition onto at least a part of the substrate, a coating method and a printing method can be used. In the coating method, the coating agent composition can be applied by using an air spray, a brush, a bar coater, a meyer bar, an air knife and the like. Moreover, in the printing method, a method such as gravure printing, reverse gravure printing, offset printing, flexo printing and screen printing can be used. Note that the drying condition is not particularly limited as long as the organic solvent is removed, and may be heating treatment according to needs.

In the coating agent composition, in the case of using the active energy ray curing resin as the binder resin, preferably, the coating agent composition is applied, the organic solvent is removed therefrom, and thereafter, the active energy ray is irradiated onto the coating agent composition to cure the binder resin.

Here, as the active energy ray to be irradiated in the event of curing the coating agent composition, at least any one of the ultraviolet ray, the electron beam, the X-ray, the infrared ray and the visible ray can be used. Among these active energy rays, it is preferable to use the ultraviolet ray or the electron beam from viewpoints of a curing capability and a resin deterioration.

Then, in the event of curing the coating agent composition by the ultraviolet irradiation, a variety of ultraviolet irradiation devices can be used. As the ultraviolet irradiation device, a xenon lamp, a high pressure mercury lamp, a metal halide lamp and the like can be used. Then, an irradiation amount of the ultraviolet ray is usually 10 to 10000 mJ/cm$^2$. However, from a viewpoint of curing properties of the composition, it is preferable that the irradiation amount of the ultraviolet ray be 100 mJ/cm$^2$ or more. Moreover, from a viewpoint of flexibility of such a cured product, it is preferable that the irradiation amount of the ultraviolet ray be 5000 mJ/cm$^2$ or less.

Here, in the case of using the active energy ray curing resin as the binder resin, a film thickness of the coating film, which is as a film thickness after the curing, is preferably 0.5 μm to 20 μm, more preferably 2 μm to 10 μm. That is to say, from a viewpoint of enhancing surface hardness of the cured film, and from a viewpoint of curing shrinkage properties of the coating agent composition by the irradiation of the active energy ray, it is preferable that the film thickness of the coating film stay within this range.

In a case where the film thickness of the coating film is 0.5 µm or more, sufficient surface hardness and durability can be obtained. Moreover, in a case of the curing by the ultraviolet irradiation under the presence of oxygen, then curing inhibition by oxygen is prevented, and it becomes possible to suppress the performance decrease of the coating film. Moreover, in a case where the film thickness of the coating film is 20 µm or less, then there can be suppressed an occurrence of a crack in the coating film, which is caused by the curing shrinkage of the coating agent composition by the irradiation of the active energy ray, and exfoliation of the coating agent composition from the substrate. Moreover, in a case where the film thickness of the coating film is too thick, then in the event of the curing by the ultraviolet irradiation, the photocatalyst particles absorb the ultraviolet ray, whereby the ultraviolet ray is not fully irradiated onto the whole of the coating film, sometimes causing the exfoliation from the substrate. However, in the case where the film thickness of the coating film is 20 µm or less, an ultraviolet ray, which is sufficient, is irradiated onto the whole of the coating film, and accordingly, the exfoliation is prevented, and it becomes possible to enhance the adherence onto the substrate.

Here, in the coating film of the present embodiment, it is preferable that, between the photocatalyst particles and the cuprous oxide particles, routes be formed, through which electrons photoexcited in the photocatalyst particles move to the cuprous oxide particles. Copper oxide (I) has properties to be gradually oxidized and become copper oxide (II) upon being left standing in the air for a long time. Then, as mentioned above, a protein denaturing action of the copper oxide (II) is extremely weaker in comparison with the copper oxide (I), and accordingly, in some case, the high antibacterial action and antiviral action are lost when the copper oxide (I) is oxidized. However, in a case where the routes through which the excited electrons move are present between the photocatalyst particles and the cuprous oxide particles, electrons coming from the photocatalyst particles excited by the excitation light are injected into the copper oxide (II) even if the copper oxide (I) is oxidized to become the copper oxide (II). As a result, the copper oxide (II) is reduced to the copper oxide (I). Therefore, it becomes possible for the coating film of the present embodiment to express the high antibacterial properties and antiviral properties for a long period of time even in the air.

Such routes through which the photoexcited electrons move may be formed by bringing the photocatalyst particles and the cuprous oxide particles into direct contact with each other. Moreover, the routes may be formed by interposing a medium, which enables electron movement, between the photocatalyst particles and the cuprous oxide particles.

Here, a method of forming such moving routes of the excited electrons is not particularly limited. As the method of forming the routs, there are mentioned a method of mixing the cuprous oxide particles and the photocatalyst particles by a mortar and the like in a preparation stage of the coating agent composition, a method of stirring the cuprous oxide particles and the photocatalyst particles in a solvent therein, and the like. Moreover, a method of precipitating the copper oxide (I) on the surfaces of the photocatalyst particles by using a chemical reaction is also mentioned. Furthermore, a method of compositing the photocatalyst particles and the copper oxide (II) with each other by a conventional method and thereafter reducing the copper oxide (II) to the copper oxide (I) by reduction treatment is also mentioned. By the methods as described above, it becomes possible to bring the photocatalyst particles and the cuprous oxide particles into direct contact with each other and to form the routes.

Note that, as mentioned above, it is preferable that the coating agent composition according to the present embodiment be prepared by mixing the metal oxide particles, the binder resin and the organic solvent with the photocatalyst particle dispersion liquid and the cuprous oxide particle dispersion liquid. Therefore, as the above-described method of forming the routes, a method is preferable, which is of sufficiently enhancing mass concentrations of the photocatalyst particles and the cuprous oxide particles in the coating film, which is obtained by curing the coating agent composition, so that the photocatalyst particles and the cuprous oxide particles can be brought into physical contact with each other in the inside of the coating film.

As described above, the antibacterial/antiviral member according to the present embodiment includes: the substrate; and the coating film, which is provided on the substrate and is formed of the coating agent composition. Then, the coating agent composition contains the photocatalyst particles composed of the metal oxide in which the upper end potential of the valence band is 3 V (vs SHE) or more and the lower end potential of the conduction band is 0.16 V (vs SHE) or less. Moreover, the coating agent composition contains the cuprous oxide particles, the metal oxide particles without the photocatalytic activity, the binder resin, and the organic solvent. Then, in the coating film, the routes through which the electrons photoexcited in the photocatalyst particles, are formed between the photocatalyst particles and the cuprous oxide particles. Therefore, the coating film formed of the coating agent composition generates visible light responsive photocatalytic activity. By the oxidation reaction of this visible light responsive photocatalytic activity, and by the protein denaturing action by the cuprous oxide particles, the bacteria and the virus, which are brought into contact with the coating film, are inactivated in such a manner that the organic matter containing the protein as a main component is decomposed/denatured. Therefore, the coating film according to the present embodiment expresses extremely high antibacterial performance and antiviral performance.

EXAMPLES

A description is made below in more detail of the present invention by examples and comparative examples; however, the present invention is not limited to these examples.

Example 1

<Preparation of Photocatalyst Particle Dispersion Liquid>

First, as the photocatalyst particles, anatase-type titanium oxide AMT-100 (average primary particle diameter: 6 nm) made by Tayca Corporation was prepared. Moreover, as the dispersant, DISPERBYK (registered trademark)-111 made by BYK Japan KK was prepared.

Next, 10 parts by mass of the photocatalyst particles were added to 88 parts by mass of methyl ethyl ketone, and 2 parts by mass of the dispersant were gradually added thereto while dispersing the photocatalyst particles by the bead mill, whereby a photocatalyst particle dispersion liquid dispersed into methyl ethyl ketone was obtained. Note that a solid content of the photocatalyst particle dispersion liquid was 10% by mass. Moreover, an average secondary particle diameter of the titanium oxide, which was measured by the dynamic light scattering, was 90 nm.

<Preparation of Cuprous Oxide Particle Dispersion Liquid>

First, as the cuprous oxide particles, copper oxide (I) nanopowder (average primary particle diameter: 18 nm) made by US Research Nanomaterials, Inc. was prepared. Moreover, as the dispersant, DISPERBYK-111 made by BYK Japan KK was prepared.

Next, 5 parts by mass of the cuprous oxide particles were added to 94 parts by mass of methyl ethyl ketone, and 1 parts by mass of the dispersant was gradually added thereto while dispersing the cuprous oxide particles by the bead mill, whereby a cuprous oxide particle dispersion liquid dispersed into methyl ethyl ketone was obtained. Note that a solid content of the cuprous oxide particle dispersion liquid was 5% by mass. Moreover, an average secondary particle diameter of the cuprous oxide particles, which was measured by the dynamic light scattering, was 110 nm.

<Preparation of Coating Agent Composition>

First, methyl ethyl ketone-dispersed silica sol MEK-ST made by Nissan Chemical Industries, Ltd. was prepared. Note that a content of $SiO_2$ in this silica sol was 30% by mass. Moreover, a primary particle diameter of $SiO_2$ was 10 to 20 nm, and an average secondary particle diameter of $SiO_2$, which was measured by the dynamic light scattering, was 30 nm. Furthermore, there were also prepared: isocyanate-curing acrylic resin Acrydic A801 (solid content: 50% by mass) made by DIC Corporation; and polyisocyanate Duranate TPA100 (solid content: 100% by mass) made by Asahi Kasei Chemicals Corporation.

First, 30 parts by mass of the obtained photocatalyst particle dispersion liquid and 5 parts by mass of the obtained cuprous oxide particle dispersion liquid were mixed with each other. Next, 20 parts by mass of the silica sol, 10 parts by mass of the acrylic resin, 0.9 parts by mass of the polyisocyanate and 34.1 parts by mass of the methyl ethyl ketone were mixed with this mixture, and were stirred by using the stirrer. In such a way, 100 parts by mass of a coating agent composition of this example were prepared.

<Preparation of Antibacterial/Antiviral Member>

The above-described coating agent composition was applied onto a polyethylene terephthalate film by using the bar coater #20, was heated and dried at 80° C. for 5 minutes, and thereafter, was cured at room temperature for 24 hours. In such a way, an antibacterial/antiviral member for evaluating this example was obtained. Note that, as the polyethylene terephthalate film, Teijin Tetron Film (registered trademark) HPE (PET thickness: 50 μm) made by Teijin DuPont Films Japan Limited was used. Note that a film thickness of the already cured antibacterial/antiviral member, which was measured by a micrometer, was 2.5 μm.

Example 2

As UV curing resin, polymer acrylate Unidic V-6841 (solid content: 60% by mass) made by DIC Corporation was prepared. Moreover, as the photoinitiator, a photoinitiator IRGACURE 754 (molecular weight: 370) made by BASF Japan Limited was prepared. Furthermore, as the glycol ether-based solvent, propylene glycol monomethyl ether was prepared.

30 parts by mass of the photocatalyst particle dispersion liquid obtained in Example 1 and 5 parts by mass of the cuprous oxide particle dispersion liquid were mixed with each other. Next, with this mixture, there were mixed: 20 parts by mass of the silica sol, 10 parts by mass of the UV curing resin and 0.2 parts by mass of the photoinitiator, which were used in Example 1; 5 parts by mass of the propylene glycol monomethyl ether; and 29.8 parts by mass of the methyl ethyl ketone, and then a resultant mixture was stirred by using the stirrer. In such a way, 100 parts by mass of a coating agent composition of this example were prepared.

The above-described coating agent composition was applied onto the polyethylene terephthalate film of Example 1 by using the bar coater #20, and was heated and dried at 120° C. for 5 minutes. Next, an ultraviolet ray was irradiated onto a resultant by using an electrodeless ultraviolet lamp so that an accumulated light quantity could become 200 $mJ/cm^2$. In such a way, an antibacterial/antiviral member for evaluating this example was obtained. Note that a film thickness of the already cured antibacterial/antiviral member, which was measured by a micrometer, was 2.5 μm.

Example 3

An antibacterial/antiviral member for evaluating this example was obtained in a similar way to Example 2 except for using 0.2 parts by mass of a photoinitiator with a low molecular weight. Note that, as the photoinitiator with a low molecular weight, a photoinitiator DAROCUR 1173 (molecular weight: 164.2) made by BASF Japan Limited was used.

Example 4

An antibacterial/antiviral member for evaluating this example was obtained in a similar way to Example 2 except for adding 0.2 parts by mass of the dimethylsiloxane compound and setting the parts by mass of the methyl ethyl ketone at 29.6 parts by mass in the event of preparing the coating agent composition. Note that, as the dimethylsiloxane compound, EFKA 3883 (solid content: 70% by mass, polysiloxane-denatured polymer having an unsaturated bond on an end group) made by BASF Japan Limited was used.

Example 5

An antibacterial/antiviral member for evaluating this example was obtained in a similar way to Example 2 except for adding 0.3 parts by mass of the fluorine-containing olefin compound and setting the parts by mass of the methyl ethyl ketone at 29.5 parts by mass in the event of preparing the coating agent composition. Note that, as the fluorine-containing olefin compound, MEGAFACE (registered trademark) RS-75 (solid content: 40% by mass, fluorine-containing olefin compound having an unsaturated bond) made by DIC Corporation was used.

Example 6

10 parts by mass of the photocatalyst particle dispersion liquid obtained in Example 1 and 1.5 parts by mass of the cuprous oxide particle dispersion liquid were mixed with each other. Next, with this mixture, there were mixed: 5 parts by mass of the silica sol, 3 parts by mass of the UV curing resin and 0.06 parts by mass of the photoinitiator, which were used in Example 2; 1 parts by mass of the propylene glycol monomethyl ether; and 65 parts by mass of the methyl ethyl ketone, and then a resultant mixture was stirred by using the stirrer. In such a way, 100 parts by mass of the coating agent composition of this example were prepared. Then, a coating film was formed in a similar way to Example 2, whereby an antibacterial/antiviral member for evaluating this example was obtained. Note that a film thickness of the already cured antibacterial/antiviral member, which was measured by a micrometer, was 0.4 μm.

Example 7

<Preparation of Photocatalyst Particle Dispersion Liquid>

In a similar way to Example 1, 20 parts by mass of the photocatalyst particles were added to 76 parts by mass of methyl ethyl ketone, and 4 parts by mass of the dispersant were gradually added thereto while dispersing the photocatalyst particles by the bead mill, whereby a photocatalyst particle dispersion liquid dispersed into methyl ethyl ketone was obtained. Note that a solid content of the photocatalyst particle dispersion liquid was 20% by mass. Moreover, an average secondary particle diameter of the titanium oxide, which was measured by the dynamic light scattering, was 110 nm.

<Preparation of Cuprous Oxide Particle Dispersion Liquid>

In a similar way to Example 1, 10 parts by mass of the cuprous oxide particles were added to 88 parts by mass of methyl ethyl ketone, and 2 parts by mass of the dispersant were gradually added thereto while dispersing the cuprous oxide particles by the bead mill, whereby a cuprous oxide particle dispersion liquid dispersed into methyl ethyl ketone was obtained. Note that a solid content of the cuprous oxide particle dispersion liquid was 10% by mass. Moreover, an average secondary particle diameter of the cuprous oxide particles, which was measured by the dynamic light scattering, was 180 nm.

<Preparation of Coating Agent Composition>

First, 40 parts by mass of the obtained photocatalyst particle dispersion liquid and 5 parts by mass of the obtained cuprous oxide particle dispersion liquid were mixed with each other. Next, with this mixture, there were mixed: 30 parts by mass of the silica sol, 20 parts by mass of the UV curing resin and 0.4 parts by mass of the photoinitiator, which were used in Example 2; and 4.6 parts by mass of the propylene glycol monomethyl ether, and then a resultant mixture was stirred by using the stirrer. In such a way, 100 parts by mass of the coating agent composition of this example were prepared.

This coating agent composition was applied onto the polyethylene terephthalate film of Example 1 by using a baker film applicator (gap dimension: 150 μm), and was heated and dried at 120° C. for 5 minutes. Next, an ultraviolet ray was irradiated onto a resultant by using an electrodeless ultraviolet lamp so that an accumulated light quantity could become 200 mJ/cm$^2$. In such a way, an antibacterial/antiviral member for evaluating this example was obtained. Note that a film thickness of the already cured antibacterial/antiviral member, which was measured by a micrometer, was 28 μm.

Comparative Example 1

There were mixed: 25 parts by mass of the UV curing resin and 0.5 parts by mass of the photoinitiator, which were used in Example 2; 10 parts by mass of the propylene glycol monomethyl ether; and 64.5 parts by mass of the methyl ethyl ketone, and then a resultant mixture was stirred by using the stirrer. In such a way, 100 parts by mass of the coating agent composition of this example were prepared. Then, an antibacterial/antiviral member for evaluating this example was obtained in a similar way to Example 2.

Comparative Example 2

An antibacterial/antiviral member for evaluating this example was obtained in a similar way to Example 2 except for setting the parts by mass of the cuprous oxide particle dispersion liquid at 0.1 parts by mass and setting the parts by mass of the methyl ethyl ketone at 34 parts by mass in the event of preparing the coating agent composition.

Comparative Example 3

An antibacterial/antiviral member for evaluating this example was obtained in a similar way to Example 2 except for setting the parts by mass of the photocatalyst particle dispersion liquid at 1 parts by mass, setting the parts by mass of the silica sol at 30 parts by mass and setting the parts by mass of the methyl ethyl ketone at 48.8 parts by mass in the event of preparing the coating agent composition.

Comparative Example 4

In the event of preparing the coating agent composition, the parts by mass of such components were set as: 10 parts by mass for the photocatalyst particle dispersion liquid; 10 parts by mass for the silica sol; 15 parts by mass for the UV curing resin; 0.3 parts by mass for the photoinitiator; and 54.7 parts by mass for the methyl ethyl ketone. An antibacterial/antiviral member for evaluating this example was obtained in a similar way to Example 2 except for these.

Reference Example 1

In the event of preparing the coating agent composition, the parts by mass of such components were set as: 60 parts by mass for the photocatalyst particle dispersion liquid; 20 parts by mass for the silica sol; 4 parts by mass for the UV curing resin; and 0.08 parts by mass for the photoinitiator. Moreover, the parts by mass of the propylene glycol monomethyl ether were set at 2 parts by mass, and the parts by mass of the methyl ethyl ketone were set at 8.92 parts by mass. An antibacterial/antiviral member for evaluating this example was obtained in a similar way to Example 2 except for these.

Reference Example 2

10 parts by mass of the photocatalyst particles of Example 1 were added to 90 parts by mass of methyl ethyl ketone, and this mixture was subjected to ultrasonic dispersion treatment for 10 minutes, whereby a photocatalyst particle dispersion liquid dispersed into methyl ethyl ketone was obtained. Note that a solid content of the photocatalyst particle dispersion liquid was 10% by mass. Moreover, an average secondary particle diameter of the titanium oxide, which was measured by the dynamic light scattering, was 320 nm. An antibacterial/antiviral member for evaluating this example was obtained in a similar way to Example 2 except for using this photocatalyst particle dispersion liquid.

Reference Example 3

5 parts by mass of the cuprous oxide particles of Example 1 were added to 95 parts by mass of methyl ethyl ketone, and this mixture was subjected to ultrasonic dispersion treatment for 10 minutes, whereby a cuprous oxide particle dispersion liquid dispersed into methyl ethyl ketone was obtained. Note that a solid content of the cuprous oxide particle dispersion liquid was 5% by mass. Moreover, an average secondary particle diameter of the cuprous oxide particles, which was measured by the dynamic light scattering, was 460 nm. An antibacterial/antiviral member for evaluating this example was obtained in a similar way to Example 2 except for using this cuprous oxide particle dispersion liquid.

Reference Example 4

An antibacterial/antiviral member for evaluating this example was obtained in a similar way to Example 2 except for entirely substituting the methyl ethyl ketone for the propylene glycol monomethyl ether in the event of preparing the coating agent composition.

Tables 1 and 2 show contents (parts by mass) of the photocatalyst particles, the cuprous oxide particles and the metal oxide particles in 100 parts by mass of the solid content of the coating agent composition in the respective examples, and additional amounts of the glycol ether-based solvent with respect to 100 parts by mass of the solid content of the coating agent composition in the respective examples.

activity of photocatalytic products and efficacy under indoor lighting environment). Note that a test target was set to be a colon *bacillus*. Moreover, as a sharp cut filter in the test, a sharp cut filter (which cuts an ultraviolet ray with a wavelength of less than 380 nm) of Type B defined by JIS R1750 was used.

Then, the number of live bacteria was measured every hour, a rate of change of the antibacterial activity per hour was calculated, and this was defined as "antibacterial activity/time".

[Antiviral Properties]

For the coating film, a test was conducted, which conformed to JIS R1756 (Fine ceramics (advanced ceramics, advanced technical ceramics)-Determination of antiviralactivity of photocatalytic materials under indoor lighting environment-Test method using bacteriophage Q-beta). Moreover, as a sharp cut filter in the test, the sharp cut filter

TABLE 1

|  |  | Example 1 | Example 2 | Example 3 | Example 4 | Example 5 | Example 6 | Example 7 |
|---|---|---|---|---|---|---|---|---|
| Ratio in 100 parts by mass of solid content | Photocatalyst particles (parts by mass) | 21 | 20 | 20 | 20 | 20 | 20 | 20 |
|  | Cuprous oxide particles (parts by mass) | 1.7 | 1.6 | 1.6 | 1.6 | 1.6 | 1.6 | 1.6 |
|  | Metal oxide particles (parts by mass) | 41 | 39 | 39 | 39 | 39 | 39 | 39 |
| Ratio with respect to 100 parts by mass of solid content | Glycol ether based solvent (parts by mass) | 0 | 83 | 83 | 83 | 83 | 83 | 83 |
| Antibacterial properties (antibacterial activity/time) |  | 3.5 | 2.6 | 3.1 | 3.1 | 2.5 | 2.1 | 3.5 |
| Antiviral properties (antiviral activity/time) |  | 3.5 | 3.4 | 3.6 | 3.3 | 3.1 | 2.9 | 4.0 |
| Hardness |  | F | 2H | H | H | H | F | H |
| Solvent resistance |  | Δ | ◯ | ◯ | ◯ | ◯ | Δ | ◯ |
| Adherence |  | ◯ | ◯ | ◯ | ◯ | ◯ | ◯ | Δ |

TABLE 2

|  |  | Comparative example 1 | Comparative example 2 | Comparative example 3 | Comparative example 4 | Reference example 1 | Reference example 2 | Reference example 3 | Reference example 4 |
|---|---|---|---|---|---|---|---|---|---|
| Ratio in 100 parts by mass of solid content | Photocatalyst particles (parts by mass) | 0 | 20 | 0.1 | 8 | 41 | 20 | 20 | 20 |
|  | Cuprous oxide particles (parts by mass) | 0 | 0.05 | 1.6 | 1.9 | 1.7 | 1.6 | 1.6 | 1.6 |
|  | Metal oxide particles (parts by mass) | 0 | 40 | 59 | 23 | 41 | 39 | 39 | 39 |
| Ratio with respect to 100 parts by mass of solid content | Glycol ether-based solvent (parts by mass) | 67 | 83 | 83 | 56 | 83 | 83 | 83 | 0 |
| Antibacterial properties (antibacterial activity/time) |  | −0.2 | 0.2 | 0.6 | 0.6 | 4.1 | 2.0 | 1.8 | 2.2 |
| Antiviral properties (antiviral activity/time) |  | 0.1 | 0.4 | 0.7 | 0.6 | 4.0 | 3.1 | 3.0 | 2.9 |
| Hardness |  | 2H | 2H | 2H | 2H | H | B | HB | B |
| Solvent resistance |  | ◯ | ◯ | ◯ | ◯ | X | X | X | X |
| Adherence |  | ◯ | ◯ | ◯ | ◯ | X | X | X | X |

The following evaluation tests were conducted for the antibacterial/antiviral members of the respective examples, each of which was applied with the coating agent composition. Results of the tests are shown in Table 1 and Table 2 in combination.

[Antibacterial Properties]

For the coating film, a test was conducted, which conformed to JIS R1752 (Fine ceramics (advanced ceramics, advanced technical ceramics)-Test method for antibacterial (which cuts an ultraviolet ray with a wavelength of less than 380 nm) of Type B defined by JIS R1750 was used.

Then, the number of active bacteriophage Qβ was measured every hour, a rate of change of the antiviral activity per hour was calculated, and this was defined as "antiviral activity/time".

[Hardness]

Scratch hardness of the coating film was measured in conformity with the pencil method defined in JIS K5600-5-4

(Testing methods for paints-Part 5: Mechanical property of film-Section 4: Scratch hardness (Pencil method)).

[Solvent Resistance]

While thrusting a waste cloth immersed with isopropyl alcohol against the surface of the coating film, the waste cloth was reciprocally slid on the coating film ten times. Subsequently, an exterior appearance of the surface of the coating film was visually observed. As a result, a case where no abnormality was observed was evaluated as "○", a case where slight whitening was observed was evaluated as "Δ", and a case where significant whitening or exfoliation was observed was evaluated as "x".

[Adherence]

For the coating film, the adherence was evaluated at a cut interval of 1 mm in conformity with the cross-cut method in JIS K5600 (Testing methods for paints). In this event, one in which no exfoliation was observed was evaluated as "○", one in which exfoliation or jacking was observed a little was evaluated as "Δ", and one in which apparent exfoliation was observed was evaluated as "x".

As shown in Table 1, the coating film of each of Examples 1 to 7 exhibited good results in the evaluations of the antibacterial properties and the antiviral properties. Moreover, Examples 2 to 5, which used the glycol ether-based solvent, exhibited good results in each of the hardness, the solvent resistance and the adherence. Note that Example 1, which did not use the glycol ether-based solvent, and Example 6, in which the film thickness of the coating film became less than 0.5 μm, exhibited a somewhat inferior result in the solvent resistance. Moreover, Example 7, in which the film thickness of the coating film exceeded 20 μm, exhibited a somewhat inferior result in the adherence.

In contrast, as shown in Table 2, Comparative example 1, which did not contain the photocatalyst particles, the cuprous oxide particles or the metal oxide particles, and Comparative example 2, in which an amount of the cuprous oxide particles was too small, exhibited insufficient results in each of the antibacterial properties and the antiviral properties. Moreover, Comparative example 3, in which the amount of the photocatalyst particles was too small, and Comparative example 4, in which the total content of the photocatalyst particles and the metal oxide particles was too small, also exhibited insufficient results in each of the antibacterial properties and the antiviral properties.

Note that, as shown in Table 2, Reference example 1, in which the total content of the photocatalyst particles and the metal oxide particles was too large, exhibited insufficient results in the solvent resistance and the adherence though exhibited good results in the antibacterial properties, the antiviral properties and the hardness. Moreover, Reference example 2, in which the average secondary particle diameter of the photocatalyst particles was large, and Reference example 3, in which the average secondary particle diameter of the cuprous oxide particles was large, exhibited insufficient results in the hardness, the solvent resistance and the adherence though exhibited good results in the antibacterial properties and the antiviral properties. Reference example 4, which did not use the glycol ether-based solvent, exhibited an insufficient result in the film characteristics though exhibited good results in the antibacterial properties and the antiviral properties.

The entire contents of Japanese Patent Application No. 2013-101466 (filed on: May 13, 2013) are incorporated herein by reference.

Although the present invention has been described above by reference to the embodiments and the example, the present invention is not limited to those, and it will be apparent to these skilled in the art that various modifications and improvements can be made.

INDUSTRIAL APPLICABILITY

The antibacterial/antiviral member obtained by using the coating agent composition of the present invention has the photocatalytic activity capable of responding by the visible light. As a result, the antibacterial/antiviral member can express high antibacterial performance and antiviral performance even in the indoor space. Moreover, the antibacterial performance and the antiviral performance in the antibacterial/antiviral member of the present invention are capable of persisting for a long period of time.

The invention claimed is:

1. A coating agent composition, comprising:
photocatalyst particles composed of metal oxide in which an upper end potential of a valence band is 3 V (vs SHE) or more and a lower end potential of a conduction band is 0.16 V (vs SHE) or less;
cuprous oxide particles;
metal oxide particles without photocatalytic activity;
a binder resin; and
an organic solvent,
wherein, in 100 parts by mass of a non-volatile matter content of the coating agent composition, a content of the photocatalyst particles is 1 to 80 parts by mass, a content of the cuprous oxide particles is 0.1 to 5 parts by mass, and a total content of the photocatalyst particles and the metal oxide particles is 40 to 80 parts by mass, the non-volatile matter content being matter obtained by evaporating the organic solvent from a mixture of the photocatalyst particles, the cuprous oxide particles, the metal oxide particles, the binder resin and the organic solvent,
average secondary particle diameters of each of the photocatalyst particles, the cuprous oxide particles and the metal oxide particles are 50 nm to 200 nm, and
average primary particle diameters of each of the photocatalyst particles and the cuprous oxide particles are 2 nm to 80 nm.

2. The coating agent composition according to claim 1, wherein the binder resin is an active energy ray curing resin having an unsaturated hydrocarbon group, and
the organic solvent contains a glycol ether-based solvent, and further, a content of the glycol ether-based solvent with respect to 100 parts by mass of the non-volatile matter content of the coating agent composition is 10 parts by mass or more.

3. The coating agent composition according to claim 2, wherein a photoinitiator with a molecular weight of 300 or more is present in an amount of 0.1 to 5 parts by mass with respect to 100 parts by mass of the active energy ray curing resin.

4. The coating agent composition according to claim 1, further comprising a dimethylsiloxane compound including 20 to 150 units of a dimethylsiloxane component represented by ($-Si(-CH_3)_2-O-$) and an unsaturated hydrocarbon group, wherein the dimethylsiloxane compound is present in an amount of 0.1 to 5 parts by mass with respect to 100 parts by mass of the non-volatile matter content of the coating agent composition.

5. The coating agent composition according to claim 1, further comprising a fluorine-containing olefin compound including 2 to 10 units of a fluorine-containing olefin component represented by ($-CF_iH_j-CF_kH_l-$) ($0 \leq i \leq 2$, $0 \leq k \leq 2$, $i+k \geq 1$, $j=2-i$, and $l=2-k$) and an unsaturated hydrocarbon group, wherein the fluorine-containing olefin compound is present in an amount of 0.1 to 5 parts by mass with respect to 100 parts by mass of the non-volatile matter content of the coating agent composition.

6. An antibacterial/antiviral member, comprising:
   a substrate; and
   a coating film which is provided on the substrate and contains the coating agent composition according to claim 1.

7. An antibacterial/antiviral member, comprising:
   a substrate; and
   a coating film which is provided on the substrate, contains the coating agent composition according to claim 2, and further, is cured by irradiating the coating agent composition with an ultraviolet ray or an electron beam.

8. The antibacterial/antiviral member according to claim 6, wherein a film thickness of the coating film is 0.5 μm to 20 μm.

\* \* \* \* \*